US007225189B1

(12) United States Patent
McCormack et al.

(10) Patent No.: US 7,225,189 B1
(45) Date of Patent: May 29, 2007

(54) DATA SOURCE WRITE BACK AND OFFLINE DATA EDITING AND STORAGE IN A SPREADSHEET

(75) Inventors: Michael J. McCormack, Snohomish, WA (US); Robert W. Coffen, Redmond, WA (US); Richard L. Dickinson, Seattle, WA (US); Sumit Chauhan, Sammamish, WA (US); Su-Piao Bill Wu, Sammamish, WA (US); Eric W. Patterson, Sammamish, WA (US); Paul A. Hafner, Redmond, WA (US); Larry Tseng, Sammamish, WA (US); Xiaohui Pan, Bellevue, WA (US); Michael J. Eatough, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 10/782,074

(22) Filed: Feb. 19, 2004

(51) Int. Cl.
*G06F 7/00* (2006.01)
*G06F 17/00* (2006.01)

(52) U.S. Cl. ........................................ 707/10; 715/503
(58) Field of Classification Search ................ 707/10; 715/503
See application file for complete search history.

(56) References Cited

U.S. PATENT DOCUMENTS

| | | | | |
|---|---|---|---|---|
| 5,121,499 A | 6/1992 | McCaskill et al. | ........... | 715/503 |
| 5,247,611 A | 9/1993 | Norden-Paul et al. | ...... | 707/504 |
| 5,255,356 A | 10/1993 | Michelman et al. | ........ | 707/504 |
| 5,319,777 A * | 6/1994 | Perez | ........................... | 707/10 |
| 5,359,729 A | 10/1994 | Yarnell et al. | ................... | 707/2 |
| 5,396,587 A | 3/1995 | Reed et al. | ................. | 707/503 |
| 5,418,898 A | 5/1995 | Zand et al. | ................... | 707/503 |
| 5,418,902 A | 5/1995 | West et al. | .................. | 707/503 |
| 5,471,575 A | 11/1995 | Giansante | .................... | 707/503 |
| 5,510,980 A | 4/1996 | Peters | ......................... | 707/503 |
| 5,535,324 A | 7/1996 | Alvarez et al. | ............. | 707/503 |
| 5,553,215 A | 9/1996 | Kaethler | ...................... | 707/503 |
| 5,598,519 A | 1/1997 | Narayanan | ................... | 707/504 |
| 5,600,584 A | 2/1997 | Schlafly | ....................... | 707/504 |
| 5,604,854 A | 2/1997 | Glassey | ...................... | 707/504 |

(Continued)

OTHER PUBLICATIONS

Louis Davison: Professional SQL Server 2000 Database Design, Wrox Press Ltd.®, 2001.*

(Continued)

*Primary Examiner*—Christian Chace
*Assistant Examiner*—Kuen S. Lu
(74) *Attorney, Agent, or Firm*—Merchant & Gould

(57) ABSTRACT

Methods and systems provide for bi-directional communication between a spreadsheet application worksheet and a database data source that allows modified data to be written from a spreadsheet application to source data in a database data source from which the original pre-modified data was obtained. Offline data changes in a spreadsheet application are cached by a data provider application and are published to a remote data source when the spreadsheet application is synchronized with the data source. Error conditions and data conflicts resulting from new or modified data published to a database data source from a spreadsheet application worksheet are reported to a user of the spreadsheet application worksheet through a data provider application to allow the user an opportunity to resolve error conditions and data conflicts between the user's data changes and other data changes made to the same source data contained in the database data source.

31 Claims, 7 Drawing Sheets

U.S. PATENT DOCUMENTS

| | | | |
|---|---|---|---|
| 5,685,001 | A | 11/1997 | Capson et al. ............... 707/503 |
| 5,701,499 | A | 12/1997 | Capson et al. ............... 707/503 |
| 5,708,827 | A | 1/1998 | Kaneko et al. ............. 707/503 |
| 5,752,253 | A | 5/1998 | Geymond et al. ........... 707/503 |
| 5,768,158 | A | 6/1998 | Adler et al. .................. 716/11 |
| 5,812,983 | A | 9/1998 | Kumagai ..................... 707/503 |
| 5,819,293 | A | 10/1998 | Comer et al. ................ 707/503 |
| 5,881,381 | A | 3/1999 | Yamashita et al. .......... 707/503 |
| 5,890,174 | A | 3/1999 | Khanna et al. ............. 707/504 |
| 5,926,822 | A | 7/1999 | Garman ....................... 707/504 |
| 5,966,716 | A * | 10/1999 | Comer et al. ............... 707/203 |
| 5,987,481 | A | 11/1999 | Michelman et al. ........ 707/503 |
| 6,055,548 | A | 4/2000 | Comer et al. ............... 707/538 |
| 6,055,549 | A | 4/2000 | Takano ....................... 707/503 |
| 6,112,214 | A | 8/2000 | Graham et al. ............. 707/539 |
| 6,134,563 | A | 10/2000 | Clancey et al. ............. 707/503 |
| 6,138,130 | A | 10/2000 | Adler et al. ................ 707/504 |
| 6,216,139 | B1 | 4/2001 | Listou ......................... 707/503 |
| 6,292,811 | B1 | 9/2001 | Clancey et al. ............. 707/538 |
| 6,567,822 | B1 * | 5/2003 | Cudahy et al. ........... 707/104.1 |
| 6,640,234 | B1 | 10/2003 | Coffen et al. ............... 707/538 |
| 2004/0039743 | A1 * | 2/2004 | Maleport et al. ............. 707/10 |
| 2004/0103365 | A1 * | 5/2004 | Cox ............................ 715/503 |
| 2004/0138815 | A1 * | 7/2004 | Li et al. ........................ 702/2 |

OTHER PUBLICATIONS

Anonymous, "Method and Apparatus for Automatic Character Line Fill of Decimal Fields." IBM Technical Disclosure Bulletin vol. 36, No. 10, pp. 155-156, Oct. 1993.

Miastkowski, S. "Excel 5.0—a Quick-start Guide to Using Excel's Powerful New Features." Macworld vol. 11, No. 10, pp. 146-151, Oct. 1994.

Microsoft Corp. Help File on 'Series' 'Repeated Entries', and 'Auto Fill' (screen shot) of Microsoft Excel 97 (1996), taken Mar. 2001, 6 pp.

Crew, Ed, ed. "Lesson in Excel 97: Lesson One . . . ", Web page tutorial on Excel 97 downloaded from pathways.uwe.ac.uk/Edict/Excel/Excel-01.asp on Mar. 29, 2002, 6 pp.

Sonic.net. "Microsoft Excel 5.0 (Tips on Using MS Excel 5.0 Repeat Entries)" downloaded from www.sonic.net/.about.sbaumann/excel.html on Apr. 2, 2002, 5 pp.

Microsoft Office 2000/Visual Basic Programmer's Guide, "Creating Dynamic Reports with Query Tables in Excel", http://msdn.microsoft.com/library/en-us/odeopg/html/deconcreatingdynamicreportswithq . . . , downloaded May 16, 2006, 2 pp.

Khor, "Microsoft Office Excel 2003 Preview", Jun. 2003, http://msdn.microsoft.com/library/en-us/odc_x12003_ta/html/odc_xlov.asp?frame=true, downloaded May 16, 2006, 19 pp.

U.S. Appl. No. 10/667,543, filed Sep. 22, 2003 entitled "Extension of Formulas and Formatting in an Electronic Spreadsheet".

U.S. Appl. No. 11/169,856, filed Jun. 29, 2005 entitled "Modifying Table Definitions Within a Database Application".

U.S. Appl. No. 11/317,648, filed Dec. 22, 2005 entitled "Data Source Task Pane".

U.S. Appl. No. 11/300,728, filed Dec. 15, 2005 entitled "Offline Multi-Table Data Editing and Storage System".

U.S. Appl. No. 11/231,260, filed Sep. 20, 2005 entitled "Templates in a Schema Editor".

Official Action in U.S. Appl. No. 10/667,543 mailed Feb. 15, 2006.

Official Action in U.S. Appl. No. 10/667,543 mailed Aug. 2, 2006.

Davidson, "Professional SQL Server 2000 Database Design," Wrox Press Ltd., 2001, 464 pp.

* cited by examiner

| Error | Error String | |
|---|---|---|
| Server Not Found | No SharePoint List server was found at the specified URL. Please check the URL and try again. | 510 |
| Timeout | A timeout occurred while communicating with the server. Choose the Finish button to try again. | |
| Server Busy | The server is busy at this time. Choose the Finish button to try again. | 515 |
| List not Found or Unanticipated Error | An unexpected error has occurred while publishing to the server. Choose the Finish button to try again. | 520 |
| Permissions | You do not have permission to create this list. Contact your server administrator for access. | |
| Quota | Your quota for this site has been exceeded. Your list was not published to this site. | 525 |
| Additional Errors | Additional Errors have been created and accounted for, these are just an example | |

*Fig. 5*

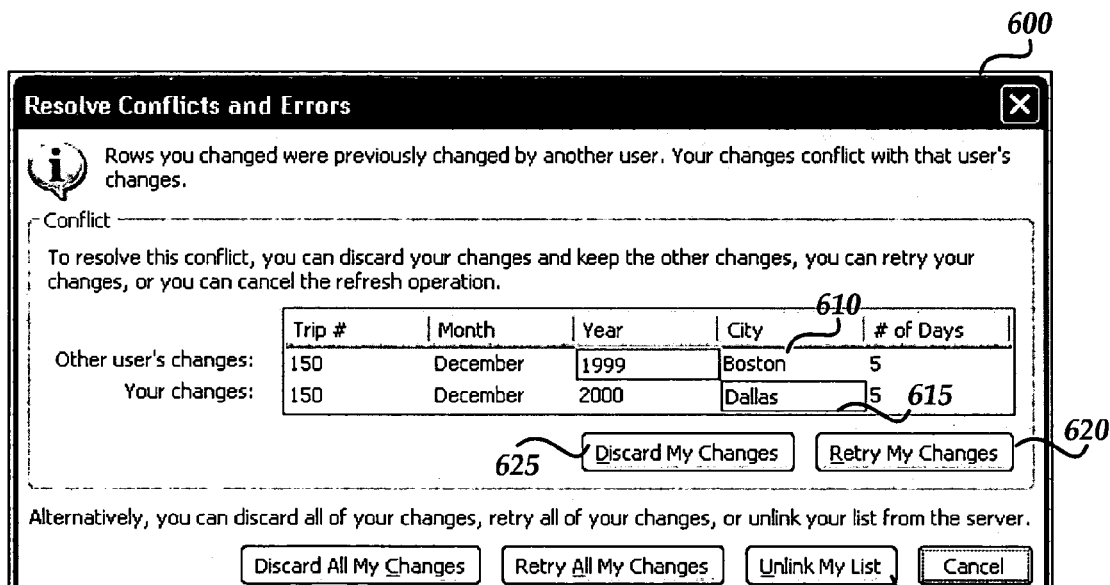

*Fig. 6*

DATA SOURCE WRITE BACK AND OFFLINE DATA EDITING AND STORAGE IN A SPREADSHEET

FIELD OF THE INVENTION

The present invention relates generally to database systems and spreadsheet application systems. More particularly, the present invention relates to bi-directional communication between a spreadsheet application and a database system to allow data source write back and offline data editing and storage in a spreadsheet application worksheet.

BACKGROUND OF THE INVENTION

Spreadsheet applications provide many well known benefits including data organization, computation, analysis and presentation. Spreadsheet applications allow users to work in offline data editing sessions, as well as online data editing sessions where spreadsheet applications may be linked to databases from which data may be imported for editing and manipulation. During online editing sessions, spreadsheet applications may also export data out to databases for storage of the exported data. However, prior systems do not allow for bi-directional communication between a spreadsheet application worksheet and a database. That is, according to prior systems, data may be brought into a spreadsheet application worksheet and read, and the data may be refreshed, but at no time may changes in the data be written back to the data source for modifying or updating the source data in the database. At most, the modified data may be written to a new table or other memory location in the database.

Accordingly, there is a need for a method and system for allowing bi-directional communication between a spreadsheet application and a database that allows modified data to be written from a spreadsheet application worksheet to source data in a database from which the original pre-modified data was obtained. There is further a need for a method and system for supporting offline data changes in a spreadsheet application that may be published to a remote data source when a connection is re-established between the data source and the spreadsheet application. There is further a need for a method and system for resolving conflicts associated with writing data from a spreadsheet application worksheet to a database data source. It is with respect to these and other considerations that the present invention has been made.

SUMMARY OF THE INVENTION

Embodiments of the present invention solve the above and other problems by providing for bi-directional communication between a spreadsheet application worksheet and a database data source. Embodiments of the present invention also provide for resolving conflicts that arise when data from a spreadsheet application worksheet is written to a database for updating or modifying data contained therein.

According to aspects of the invention, a spreadsheet application worksheet is linked to a database for bi-directional communication through a data provider application. The spreadsheet application may push data to the database or request data from the database. When data is published to the database from the spreadsheet application worksheet, the data is first cached by the data provider application. When the data provider application is directed to publish the data to the database, a determination is made as to whether publication of the data to the database will cause a data conflict with another user's changes to the same data in the database, or whether some other error condition will be created. For example, if the user's data is in conflict with another user's changes to the same data, the user may be provided information as to the conflicting changes to the data, and the user may be prompted for a resolution of the conflict. If an error condition is created by publication of the new or modified data from the spreadsheet application worksheet to the database, for example, where the user's permissions have been modified to prevent the user from exporting data to the database, an error code is passed by the database to the data provider application, which in turn provides an error condition to the user via the spreadsheet application worksheet. After the user is provided the error condition, the user may be prompted for a resolution of the error condition.

If no conflict or error condition arises, the user's modified data is written to the database to modify existing data in the database or to enter new data to the database. In addition to modifying data in the database from the spreadsheet application worksheet, the user may edit, create and delete rows and columns in the database. Additionally, if desired, the user may unlink his/her spreadsheet application worksheet from the database in order to work on data without any connection to the database. Subsequently, the user may establish a new link with the database and write changes to the data to the database data source made by the user while working in an offline environment.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 5 illustrates a table showing a plurality of potential error conditions occurring upon publication of data to a data source according to embodiments of the present invention.

FIG. 6 illustrates a computer screen display showing an illustrative dialog box for resolving conflicts and errors associated with publication of data to a data source according to embodiments of the present invention.

DETAILED DESCRIPTION

As briefly described above, embodiments of the present invention are directed to methods and systems for allowing bi-directional communication between a spreadsheet application worksheet and a remote data source. Embodiments of the present invention are also directed to resolving conflicts and errors associated with publication of data from a spreadsheet application worksheet to a remote data source.

In the following detailed description, references are made to the accompanying drawings that form a part hereof, and in which are shown by way of illustration specific embodiments or examples. These embodiments may be combined, other embodiments may be utilized, and structural changes may be made without departing from the spirit or scope of the present invention. The following detailed description is, therefore, not to be taken in a limiting sense and the scope of the present invention is defined by the appended claims and their equivalents.

Figure 1:
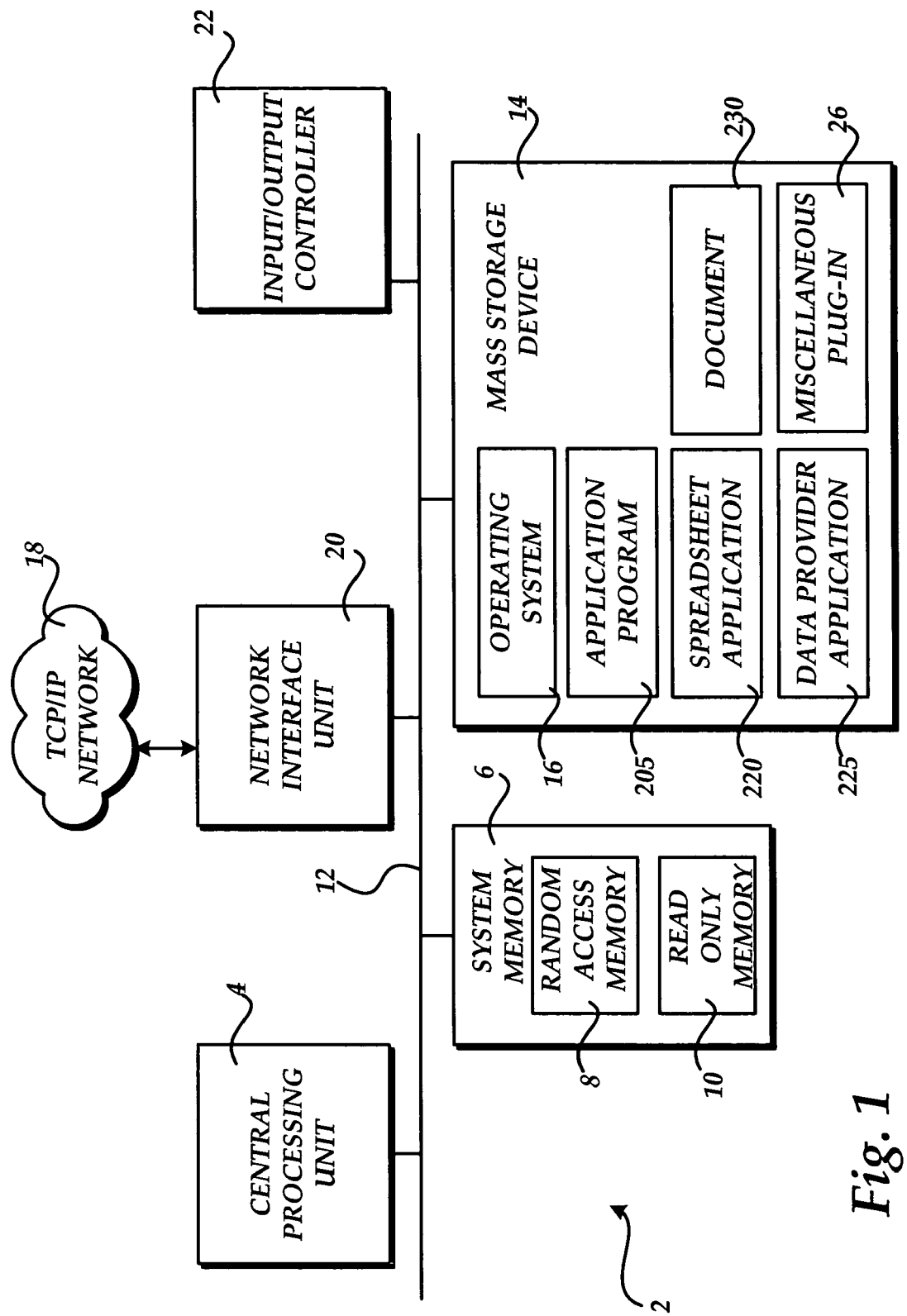
FIG. 1 is a block diagram showing the architecture of a personal computer that provides an illustrative operating environment for embodiments of the present invention.

Referring now to the drawings in which like numerals represent like elements throughout the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, the spreadsheet program 220, the data provider application 225, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating system from MICROSOFT CORPORATION of Redmond, Wash. The mass storage device 14 and RAM 8 may also store one or more application programs. In particular, the mass storage device 14 and RAM 8 may store an application program 205 for creating and editing an electronic document 24. For instance, the application program 205 may comprise a word processing application program, a spreadsheet application, a contact application, and the like. Application programs for creating and editing other types of electronic documents may also be used with the various embodiments of the present invention.

Bi-Directional Communication Between Spreadsheet and Data Source

Figure 2:
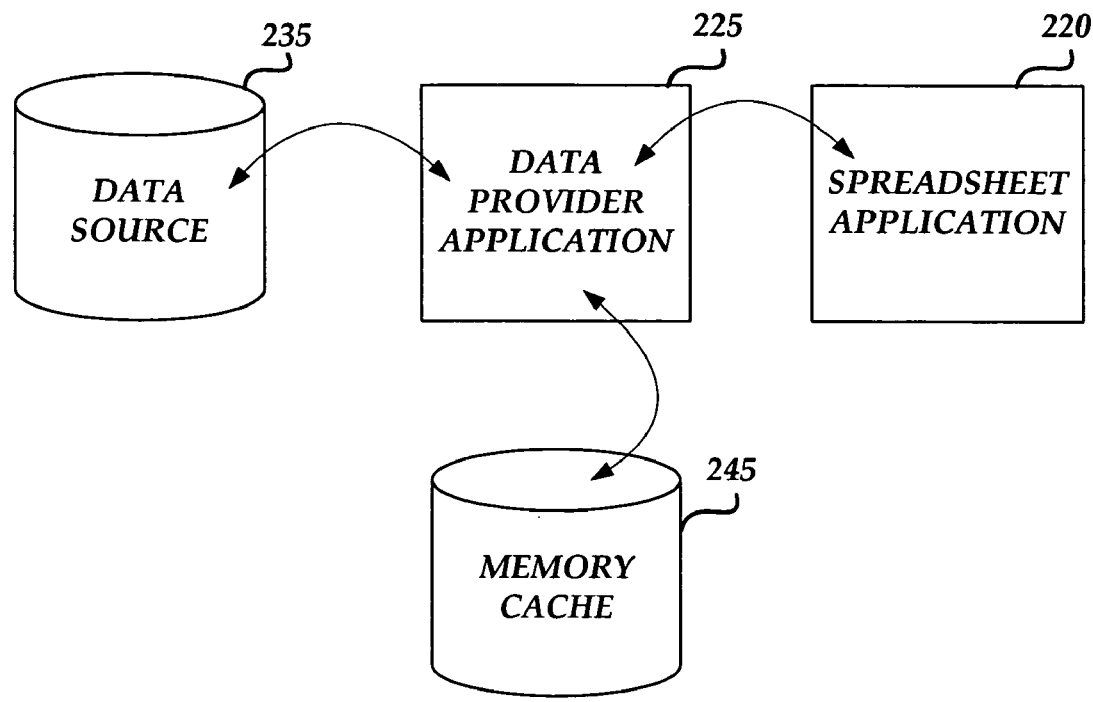
FIG. 2 is a simplified block diagram illustrating interaction between a spreadsheet application worksheet, a data provider application and a data source according to embodiments of the present invention.

FIG. 2 is a simplified block diagram illustrating interaction between a spreadsheet application worksheet, a data provider application and a data source according to embodiments of the present invention. As briefly described above, embodiments of the present invention provide for bi-directional communication between a spreadsheet application worksheet 220 and a remote data source 235 via a data provider application 225. As will be described in detail below, data may be published from the spreadsheet application worksheet 220 to a remote data source 235 via the data provider application. Data may likewise be imported from the data source 235 to the worksheet 220. The spreadsheet application worksheet 220 may be edited in an offline environment followed by reconnection to the data source 235 at which time modified data may be exported from the spreadsheet application worksheet 220 to the data source 235. Conflicts between data exported from the spreadsheet application worksheet 220 and data resident on the data source 235 may be resolved, and error conditions created by attempted publication of data from the spreadsheet application worksheet 220 to the data source 235 may be highlighted to the user.

The spreadsheet application 220 is illustrative of any suitable spreadsheet application for organizing, calculating, manipulating and presenting various types of data. An exemplary spreadsheet application for use in accordance with embodiments of the present invention is EXCEL manufactured by MICROSOFT CORPORATION of Redmond, Wash. The data source 235 is illustrative of any database for importing, exporting and maintaining data in various forms, including tabular form, cell form, row form, column form, and the like. Suitable databases include SQL Server databases and Windows SharePoint Services databases (hereafter SharePoint) manufactured by Microsoft Corporation of Redmond, Wash.

The data provider application is a software application module operatively residing between the spreadsheet application and the data source 235. The data provider application is a software module containing sufficient computer executable instructions, which when executed by a computer 2, illustrated in FIG. 1, perform the functions described herein. The data provider application 225 may operate as a standalone software application, which may be called upon by the data source 235 or spreadsheet application 220 as described herein. Alternatively, the data provider application 225 may be integrated with the spreadsheet application 220. According to one embodiment of the present invention, the data provider application 225 is integrated with the spreadsheet application and is comprised of one or more dynamically-linked library (DLL) modules, which may be called upon by the spreadsheet application 220 and the data source 235 for performing the functionality described herein. Referring still to FIG. 2, the memory cache 245 is illustrative of a memory context for storing cached data and error information passed between the spreadsheet application 220 and the data source 235.

Communication between the spreadsheet application 220 and the data source 235 via the data provider application 225 is accomplished through any suitable computer-enabled communication protocol that allows bi-directional communication between the spreadsheet application and the data source 235 via the data provider application. According to one embodiment of the present invention, the communication protocol used between the spreadsheet application and the database is the OLE-DB communication protocol. Other suitable communication protocols include SOAP, ODBC, XML web services, remote procedure calls (RPC), ADO, and the like.

In order to establish bi-directional communications between the spreadsheet application 220 and the data source 235, a communication link must first be established between the spreadsheet application and the data source through the data provider application. Generally described, the spreadsheet application may connect to the data source at the database 235 in order to push data out to the database 235, as described herein. Alternatively, the spreadsheet application may establish a link with the database and request data from the database. Alternatively, the database 235 may establish a communication link with the spreadsheet application 220 via the data provider application, and the spreadsheet application may then push data to the database 235 and pull data from the database 235.

Figure 3:
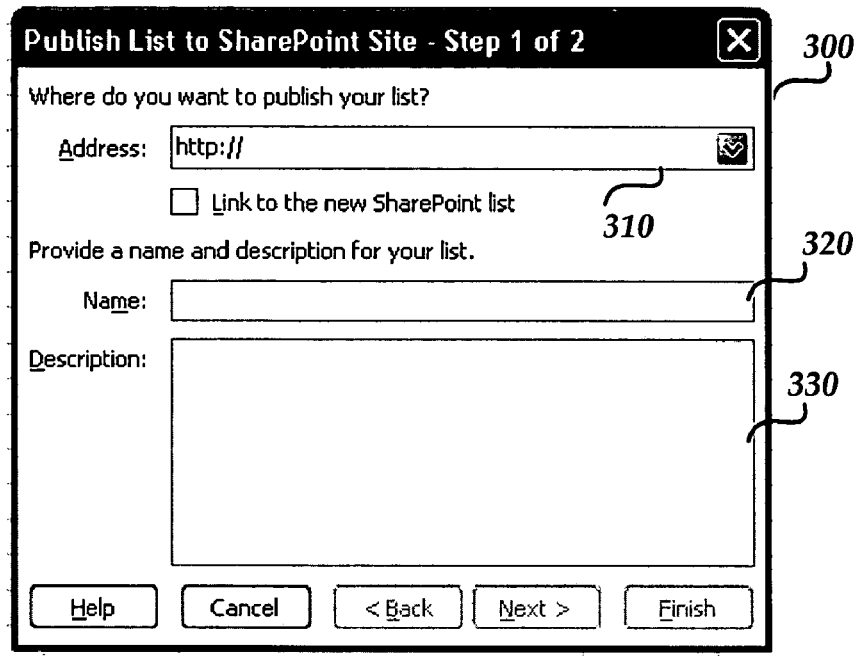
FIG. 3 illustrates an example computer screen display showing an illustrative dialog box for publishing data to a data source.

FIG. 3 illustrates an example computer screen display showing an illustrative dialog box for publishing data to a data source. According to an embodiment of the present invention, a communication link between the spreadsheet application 220 and the database data source 235 may be established by publishing data from the spreadsheet application worksheet to the database 235. According to one embodiment, the example dialog box 300 may be launched by the spreadsheet application 220 for allowing the user to establish a communication link with the database 235 to export data to the database. Referring to FIG. 3, a URL field 310 allows the user to provide the URL for a particular data source location, such as a particular SharePoint server. A Name field 320 is provided for allowing the user to specify the name of a particular data list contained in the database 235. An optional Description field 330 allows a user to provide descriptive information associated with the data as it will be published to the database 235.

Figure 4:
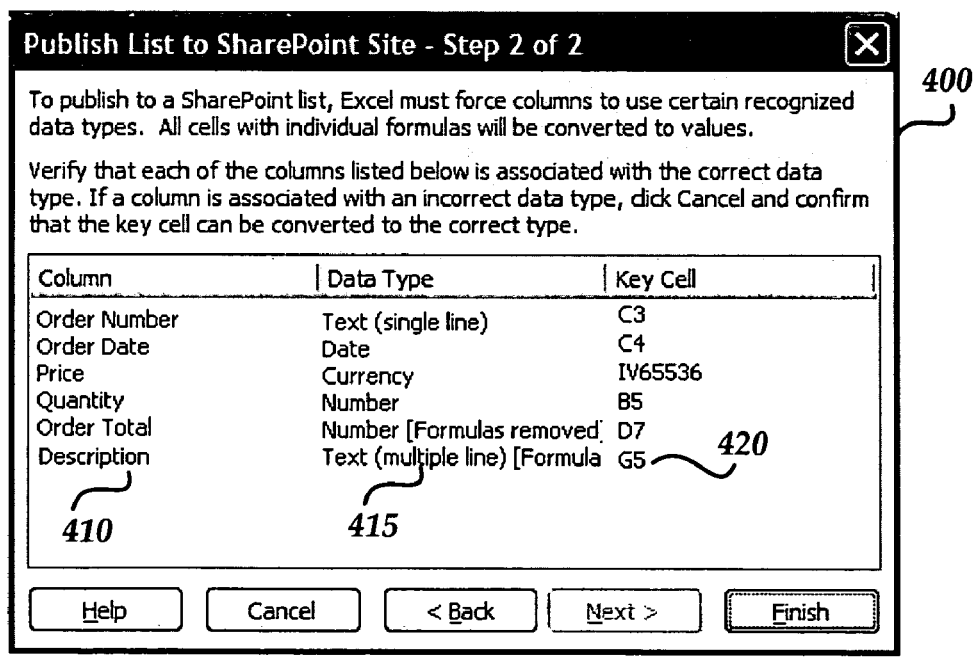
FIG. 4 illustrates a computer screen display showing an illustrative dialog box for publishing data to a data source.

Once the user submits the dialog box 300, the user may be provided with the dialog box 400 illustrated in FIG. 4 to allow the user to confirm the column and data type information associated with data to be published to the database 235. A list of columns associated with data to be published to the database 235 is shown under the Column heading 410. A list of associated data types is shown under the Data Type heading 415.

If the user confirms the data to be published to the database 235, the data is passed from the spreadsheet application 220 to the data provider application 225 where it is cached in the memory cache 245 by the data provider application 225. The data provider application 225 compares the cached data against data contained in the database 235 to which the cached data is to be published. If the data provider application determines that the cached data may be published to the database 235 without error, the data is published to the database 235 successfully, and the user is alerted as to the successful data publication. Thus, a data communication link is established between the spreadsheet application worksheet and a particular data source in the database 235. As should be understood, data publication errors can occur at anytime during the publication operation as opposed to only at the initial phase of publication.

Data Type Mapping and Database Rules Mapping

Successfully importing and exporting data to and from the spreadsheet application 220 and a particular data source (database) after a communication link has been established requires data type mapping and data rules mapping between the spreadsheet and the data source. That is, there is a definitive mapping between spreadsheet data and the data types and data rules allowed by and governing a given database system. Anytime a spreadsheet publishes data to a given data source of a given database system, whether upon an initial upload of data or during any subsequent synchronization between the spreadsheet and the data source, the data type mapping and data base rules must be followed. Data Validation is a combination of efforts from data type mapping which provides a heuristic to map a data source's native data types to a spreadsheet presentation and data validation which allows us to enforce the data integrity rules of a given data source (database). According to an embodiment of the present invention, the data validation model or schema described herein is refreshed each time data in the spreadsheet is refreshed from the data source. This means that data validation (data type mapping and data rules mapping) gets refreshed from the data source each time the user elects to synchronize the data between the spreadsheet and the data source.

Different data sources have different supported data types. This section is an illustration of the possible mapping between an exemplary Microsoft Excel spreadsheet and the data types supported in Windows SharePoint Server data source. As should be understood by those skilled in the art, the following discussion is for purposes of illustrating data validation between a given data source and a given spreadsheet and is not meant to restrict operation of the present invention to this specific spreadsheet application and this data source application. Instead, the following discussion is intended to provide an example operation of the present invention in terms of a specific spreadsheet application and a specific data source.

An Excel spreadsheet application 220 supports recognition of the following data Types.

Short Text—a value expressed in a string <256 characters

Multi-line text—text with >255 characters or contains a carriage return or line feed (CR/LF).

Number—a number

Date—the cell number format is a date or date/time format or a custom format involving year/month/day.

Currency—the cell number format is a currency or accounting format or a custom number format involving a currency symbol (including 3 letter locale currency symbols).

Hyperlink—a cell recognized by Excel's existing hyperlink features to be a hyperlink.

Boolean—a cell recognized in Excel as VT_Boolean.

Percentage—a cell containing a number and formatted as Percentage.

Data types not mentioned above may be considered "short text" data types for the purposes of list column data type determination.

Figure 4A:
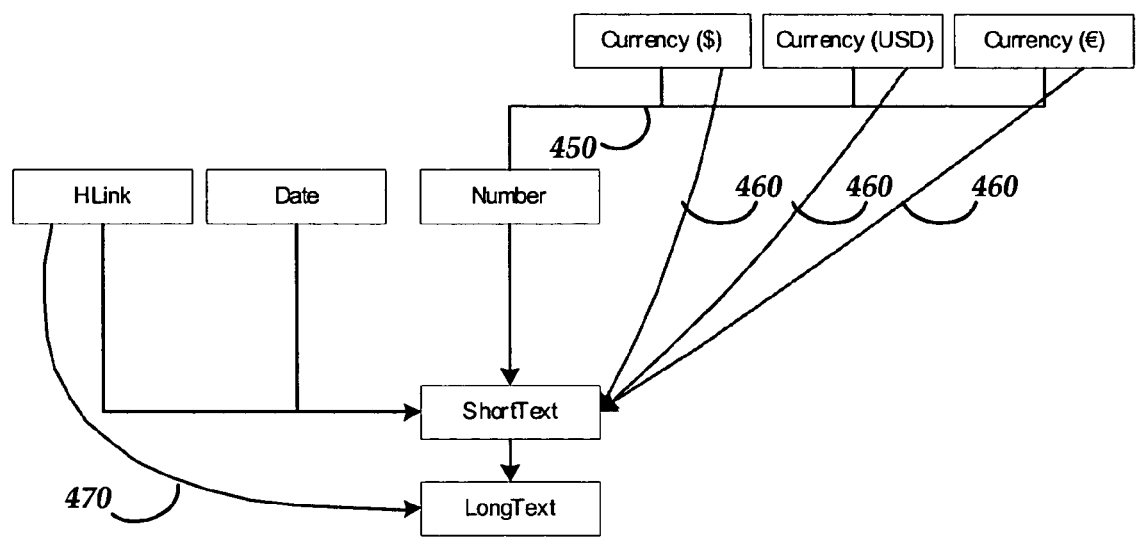
FIG. 4A is a block diagram illustrating a "best" data type selection by an exemplary spreadsheet application.

According to one embodiment, for each data cell in a column, the spreadsheet application guesses its best data type. If all the cells in a column have the same (best guess) data type, then the spreadsheet application makes that the data type of the column. If the column has cells of various data types, then spreadsheet application picks a lower fidelity data type. Referring to FIG. 4A, an illustration is presented showing how a "best" data type may be selected by an Excel spreadsheet. Note in FIG. 4A that "LongText" in this diagram is MultiLineText. Percentage is a peer to Currency. Boolean is a peer to Date. The diagram illustrated in FIG. 4A indicates the supported reductions from one data type to another. For example lines 450 are used if there are no other cells in the list column to be reduced to Number. In other words, if there are currencies of various locales, then the best data type is ShortText to support them all. Lines 460 represent an alternative to the lines 450 when more than one currency is being used. Line 470 is used when a hyperlink is >255 characters.

To find the data type of a column, look through the cells in the column, making a best guess of their individual data type. Then find the nearest data type to which the spreadsheet application supports reduction of all the data types found in the column. For example, say a column contains individual cells that could best be typed as Number, Currency ($) and Currency (€). The best data type for the column would be ShortText, because the two different Currency cells would necessitate using lines 460, illustrated in FIG. 4A, to ShortText to preserve the most significant currency type of each cell. For another example, say a column contained MultiLineText and Number. The best data type then Would be MultiLineText. For another example, say a column contained HLink, and Number. The best data type would be MultiLineText or ShortText depending on the character length of the longest HLINK URL.

The following is a brief discussion of particular data type conversions between data types in a spreadsheet and data types in a given data source. For conversion of a number in a spreadsheet cell to text for a data source, for example a SharePoint List, the cell number formatted display text for that cell may be used for the data source. For currency, the displayable text for a currency cell may be converted into text for the data source and, the international markings for a currency may be preserved when converted to text. This includes the locale specific currency symbols, such as the €, as well as the three letter locale abbreviation, and current decimal separators. For conversion of percentages to text, the percentage in a spreadsheet cell is converted to text for a data source location, for example a SharePoint List, and the cell number formatted display text is used for that cell. According to one embodiment, the formatting specified decimal places may be used.

When a hyperlink in a cell is converted to text for a data source, the URL of the Hyperlink may be used. It is possible to have a hyperlink longer than 255 characters and therefore might necessitate the Multi-line text data type. The Hyperlink( ) function can result in a hyperlink value recognized by the spreadsheet application. If the formula is ignored, the hyperlink value or a converted Text version is sent to the data source.

For date to text conversions, a date in a cell is converted to text for a data source, for example a SharePoint List, and the formatted display text for a date is used. Empty cells may be converted to empty strings for text or hyperlink data types. Alternatively, empty cells may be converted to zero. According to one embodiment, for date formatting, a zero is Jan. 1, 1900. According to an embodiment, if the user is using the 1904 date system (Tools/Options/General), dates are converted to 1900 date serial number before sending the date to the data source. For example, 1462 is added to the 1904-based date (the difference from 1904 date system and 1900 date system. For a linked list, the data source may send 1900 date system serial numbers back to the spreadsheet. The spreadsheet will convert the 1900 dates back to 1904 serial numbers when refreshed on a spreadsheet workbook with the 1904 date system.

For other data type categories not mentioned above, the spreadsheet cells may be considered as text cells, and the displayable text for a given cell may be exported to the data source. That is, the text that is shown in the spreadsheet cell for a number, for example and not the unformatted number shown in the formula bar. Different Data Sources have different column requirements. For example, Microsoft SharePoint has a limit of columns of a particular data type. After the spreadsheet application 220 determines the data types for each column, as described above, if the spreadsheet application finds the maximum of any data type exceeded, the spreadsheet application may warn the user appropriately during publishing if data to the data source as described above with respect to FIGS. 2, 3 and 4. According to an embodiment, for optimization purposes, the data type determination may be run before providing the user the dialog illustrated in FIG. 3. That is, if the maximum number of a data type is exceeded, for example, a warning may be immediately provided to the user so that the user does not needlessly attempt to publish data erroneously.

Columns beyond the maximum allowed may be labeled as data type "[Not Assigned]" in the Data Type column of the list view of the Publish to SharePoint wizard, illustrated above with respect to FIGS. 3 and 4. The "Please confirm . . . " label will be replaced with "This list exceeds the maximum number of <datatype> columns are available in your data source. You must modify the list before exporting to the data source. Please choose Cancel." The <datatype> is replaced with the name of the data type. The Back, Next, and Finish buttons may be disabled. The first data type column count that overflows is described in this warning message. According to one embodiment, in the event that more than one data type column count is exceeded, the user may not be directly notified in this label until he/she fixes the first data type problem and returns to the dialog. However, the user can see exactly which columns are beyond the maximum allowed for any data type by looking for "[Not Assigned]" in the Data Type column of the list view.

Different data sources also have different supported sets of data types each bringing their own user expectations. For purposes of illustration, the following discussion details an implementation for Microsoft SharePoint data source, but the method can be easily carried over to other data sources. To ensure a good experience editing lists in the spreadsheet, for example Microsoft Excel, the SharePoint data types on List ranges must be supported and enforced. A lack of enforcement would result in errors when synchronizing the list data from the spreadsheet with the data in the data source. For example, the data types supported by Microsoft SharePoint include single line of text; multiple lines of text; number (min/max, decimal places, show as percentage); currency (min/max, decimal places, show as percentage, currency format); date and time (date/time format); lookup (information on SharePoint site); choice (single and multiple); Yes/No (checkbox); Hyperlink; calculated column; attachment; and scale/matrix. Each of the above types will be mapped to a combination of validation and formatting in the spreadsheet application.

For purposes of illustration, Table 1 below lists Data Types available in Microsoft SharePoint version 2, along with the format and validation that the data type will be mapped to in Microsoft Excel. Below the table is a section for each data type with additional information.

TABLE 1

| Data Type | Format | Validation |
|---|---|---|
| Single line of text | Text Number Format General Alignment | <=255 Characters (127 DBCS) |
| Multi-Line Text | Text Number Format General Alignment Row Height Wrap text on | <32767 characters (Excel's Limit) (SharePoint supports $2^{30}-1$) |
| Number | Number type with thousands separator General Alignment. | Current Excel Limits <=1.79769313486231E308 >=2.2250738585072E-308 (Sharepoint - Float number limitations) |
| Currency | Accounting Format with Symbol General Alignment | Current Excel limits. <=1.79769313486231E308 >=2.2250738585072E-308 (Sharepoint - Float number limitations) |
| Date/Time | Date or Data and Time format (display ##### for pre-1900 dates) | >=1/1/1753, <=12/31/8999 2/29/1990 is a valid date in Excel, but invalid on SharePoint. We will not prevent users from entering this date in Excel, but it may get rejected when the record is committed. |
| Checkbox (Yes/No) | General Number format General Alignment | = True or = False |
| Calculated | Number format is based on the data type the user indicated that the formula returns. General Alignment | Must refer to cells in same row. Limited to subset of functions |
| Hyperlink | General Alignment General Number format Displayed as Hyperlink Max length of 255 for each description and URL | URL must start with one of the following protocols. If not, it is rejected to avoid security holes. (leading spaces should be trimmed) The protocols are: mailto: http:// file:// file:\\\\ ftp:// https:// gopher:// wais:// msn: news: nntp: mid: cid: prospero:// telnet:// rlogin: tn3270: pnm:// (Real Audio media) mms:// (Media Server media) outlook: |
| Attachment | Hidden in Excel | Hidden in Excel |
| Choice - Single | Text Number format General Alignment | List validation (shown as dropdown) <=255 characters |
| Choice - Multi | Text Number format General Alignment | List validation (shown as dropdown with multi-select) <=255 characters? |
| Lookup - Single | General number format General Alignment | List validation (shown as dropdown with multi-select). <=255 characters when in a document library otherwise <=32767 characters. |
| Scale/Matrix | Hidden in Excel | Hidden in Excel |

Each data type has additional options including validation, default value, and whether the field is required. Table 2 below identifies the options for each data type. These options are selected as part of setting or changing the data type for Microsoft SharePoint.

TABLE 2

| Data Type | Type Options | Default value? | Required to contain value? | Validation allowed |
|---|---|---|---|---|
| Short Text | Max Size | Allowed | Allowed | Max Characters |
| Multiple Lines of Text | Rich Text # of Lines to show | Not Allowed | Allowed | None |
| Number | Show as percentage (auto, 1–5) Number of decimal places | Allowed | Allowed | Min Max |
| Currency | Currency type Number of decimal places | Allowed | Allowed | Min Max |
| Date/Time | Display Type: Date Only, Date Time | Allowed (None, Today, specific date) | Allowed | N/A |
| Choice (single, no fill-in) | SharePoint allows dropdown or radio button option. Excel will be dropdown only. | Allowed | Allowed | N/A |
| Lookup (single) | N/A | Not Allowed | Not Allowed | N/A |
| Checkbox (Yes/no) | Display as check-box or drop-down | Required (yes or no) | By Definition | None |
| Hyperlink | SharePoint: display as: Hyperlink or Picture Excel: Hyperlink only. | Not Allowed | Allowed | N/A |
| Calculated Columns | Value based on result of formula | Not allowed | Not Allowed | N/A |

The data mapping and data rules described above are enforced and implemented through a validation process. Each data type has specific validation types that make sense, and according to an embodiment, the data source, for example SharePoint, and the data provider application 225 allow users to make changes to the default validation rules described below to customize the validation process. This validation will be performed on the client (spreadsheet application 220) typically, but the database (data source) also may perform the validation process because the client does not always have the latest schema version or validation version.

The validation process occurs at the following three levels, but all are exposed to the user in similar ways:
1. Cell level
2. Row-level (client)
3. Row-level (server)

For cell level validation, for unchanged records, unedited rows will be fully validated by background error checking. For example, say a user has a SharePoint list in Excel. The list is modified to require a column that previously was not required, or a column such as Yes/No that always requires a value is added. When the user attempts to synchronize their spreadsheet with the data source with changes made to data in the spreadsheet, rather than prompting the user for every value in records that were previously written, only those rows that the user modified are validated against allowable data types and data mapping rules. Also, for unchanged records unedited rows are not validated by foreground error checking. But, according to an embodiment of the invention, newly added rows, and changed rows are validated against the data mapping and data type rules. Newly added items are validated by foreground error checking. All Columns in a newly added or changed row are subject to validation whether or not the values have changed.

For cell level validation, a required column that is ignored by the user (left blank) is subject to validation checking and is not allowed. Ignoring or leaving blank a required cell or column would circumvent required data validation for the data source and potentially compromise the data. According to an embodiment, in addition to disabling (or repurposing) the Ignore button, foreground error checking occurs regardless of the data validation setting provisioned by the user, for example in the options dialog >>Tools>Options>>Error Checking>Data validation error.

In addition to validating adherence to required database rules, use of valid data types is also validated. For Choice, data fill-ins are allowed, and multi-select/single select choice may validate properly based on selected items in a data source list. If items selected and delimited are not in the list then validation may fail (providing for the exception on Allow Fill-ins). If all of the items are in the list validation should pass. Data Lookups should validate based on values in the list only. If the value entered by the user is not in the list, then it is a validation error. If the value is in the list then it is acceptable. Cell text should always match at least one item in the complete list. In the case that the text matches more than one item and the cell value was manually entered by the user as opposed to selecting it from a drop down, the first item in the list will always be selected For validation of Hyperlinks, there can be data stored in a hyperlink that may not get published and would get lost without the user knowing what has happened if entry and publish were allowed in a text column. Hyperlinks cannot exceed 255 characters for both the descriptive and hyperlink text each. Hyperlinks are only valid in hyperlink and multi-line text columns.

When there is a restriction on a data field, that restriction may be displayed to the user in an easy to understand fashion. When there is no restriction, the text "No restriction" may be displayed in place of restriction. Table 3 below provides an illustrative list of Field types and corresponding Validation types and displayed messages.

TABLE 3

| Field | Validation types | Message |
|---|---|---|
| Single line of text | Maximum number of characters (1–255) | The value cannot exceed the maximum of <MaxLen> characters. |
| Multiple Lines of text | May or may not allow rich HTML text | The value cannot contain formatted text |
|  | Length exceed 255 on DOC LIB ONLY | The value cannot exceed a maximum of 255 characters. |
| Number | Min and Max set/Between* | Value must be a number between <Min> and <Max> |
|  | Min set/Greater Than or equal to | Value must be a number greater than or equal to <Min> |
|  | Max set/Less Than or equal to* | Value must be a number less than or equal to <Max> |
|  | Not Between* | Value must be a number not between <Min> and <Max> |
|  | Equal To* | Value must be a number equal to <Reference (if possible)> |
|  | Not Equal To* | Value must be a number not equal to <Reference (if possible)> |
|  | Greater than* | Value must be a number greater than or equal to <Min> |
|  | Less than* | Value must be a number less than or equal to <Max> |
|  | Not a number | Value is not a number |
| Currency | Same as number (except ignores currency sign) | See Number |
|  | Wrong Currency - No alert is shown other than the remark being "Pending." | PENDING |
| Date and Time | Must be a date | Value must be a valid date |
|  | Must be after 12/31/1752, before 1/1/9000 | Value must be a valid date |
|  | 2/29/1900 | No Alert |
|  | Between* | Value must be a date between <Min> and <Max> |
|  | Greater Than or equal to* | Value must be a date greater than or equal to <Min> |
|  | Less Than or equal to* | Value must be a date less than or equal to <Max> |
|  | Not Between* | Value must be a date not between <Min> and <Max> |
|  | Equal To* | Value must be a date equal to <Reference (if possible)> |
|  | Not Equal To* | Value must be a date not equal to <Reference (if possible)> |
|  | Greater than* | Value must be a date greater than or equal to <Min> |
|  | Less than* | Value must be a date less than or equal to <Max> |
| Lookup | Must be among values in lookup | Value must match one of the listed items. |
| Choice | Single - Similar to lookup | Value must match one of the listed items. |
|  | Multiple - Similar to lookup | Value must match one or more of the listed items. |
|  | Will fill in require single line of text validation | No. Choice will need to validate proper delimiters and values + fill-in Choice fields cannot have the characters; # in fill-in values. |
| Hyperlink | URL must start with one of the following protocols. If not, it is rejected to avoid security holes. (leading spaces should be trimmed) The protocols are. mailto: http:// file:// file:\\\\ ftp:// https:// msn: news: nntp: pnm:// (Real Audio media) mms:// (Media Server media) outlook: | Value is required to be a valid hyperlink and may not exceed a total of 255 characters for description and 225 for URL. |

For row level (client side) validations, validations are related to required fields being blank. The data provider application 225 has information as to which columns are required, and the data provider application enforces the rules when the user commits a row. Table 4 below provides a list of row level (client side) errors and related error messages displayed to the user.

TABLE 4

| Error | Occurs when | Message |
|---|---|---|
| Required field missing | One field isn't filled in | "You must specify a non-blank value for <fieldname>." |
|  | Multiple fields aren't filled in | "You must specify a non-blank value for <fieldname1>, <fieldname2>, and <fieldname3>." |

Row level (server-side) validation is performed at the database (data source) side. If the user has an out-of-date schema (data mapping and data rules model), the user may be unable to make data changes to the data source. Additionally, the user may be restricted from altering the schema to make changes to the data mapping or data type rules. Table 5 below provides and illustrative list of server-side changes and associated effects and displayed messages.

TABLE 5

| Change on server | User change | Effect | Message |
|---|---|---|---|
| Column Add | Add row | No problem (if new column is required, it will sneak by validation - same as SP today) |  |
|  | Delete row | No problem |  |
|  | Change row | No problem |  |
|  | Change view | No problem |  |
| Column Delete | Add row | No problem unless there is a change to the deleted column. In that case they will get the same warning as a schema conflict message. | Schema conflict message: "The structure of the list has changed on the server. In order to make certain changes you will need to refresh your version of the list. Would you like to refresh now? Note: If you choose not to refresh now, you will be able to refresh later. |

TABLE 5-continued

| Change on server | User change | Effect | Message |
|---|---|---|---|
| | | | However, certain types of changes will be disallowed until you refresh." Yes/No buttons provided. |
| | Delete row | No problem | |
| | Change row | No problem unless there is a change to the deleted column. In that case they will get the same warning as a schema conflict message. | Schema conflict message |
| Data Type Change | Add row | No problem unless there is a change to the changed column. In that case they will get the same warning as a schema conflict message. | Schema conflict message |
| | Delete row | No problem unless there is a change to the changed column. In that case they will get the same warning as a schema conflict message. | Schema conflict message |
| | Change row | No problem unless there is a change to the changed column. In that case they will get the same warning as a schema conflict message. | Schema conflict message |

Some database systems, for example Microsoft SharePoint, support fields that return a result for each cell in the field based on a formula. Those formulas can contain a limited set of functions and may only refer to cells in the current list row. Data source formulas may refer to fields or values in the row by use of the field name (an internal unique name). From a user standpoint it looks like the formula is using field captions (the field "name" that the user sees and can change). If the spreadsheet application, for example Microsoft Excel, supports all of the same functions as the data source, then no conversion is necessary. On the other hand, if the spreadsheet application 220 refers to cells by cell reference rather than by a field or column name or caption, they may have to be converted to a form that the spreadsheet and data source will understand. In order to perform this conversion, a determination is first made as to whether the formula received from the data source is preceded with an equals sign. If so, the equals sign is dropped. Next, the formula is sent through the spreadsheet application's normal formula parsing routines.

The spreadsheet application preferably will treat any field names in the formula as references to labels (better known as defined names). If the parsing routines succeed, a tokenized spreadsheet formula (also known as a parsed expression) is produced. Next, the formula is passed through a conversion routine that looks for label references and matches the label references, if possible, to the field names in the data source list. For each match that is found, the label reference is replaced with a relative cell reference. The resulting formula (or parsed expression) may be populated into the cells of the calculated column. According to one embodiment, the user cannot change the formula of the calculated column in the spreadsheet application. The formula of the calculated column may only be changed on at the data source 235.

Working Offline and Synchronization/Refresh

As described above with reference to FIG. 2, data is passed between the spreadsheet application worksheet and a given data source via a bi-directional communication through the data provider application 225. Although a communication link is established between the spreadsheet and the data source, changes to data in the spreadsheet are made in an "offline" manner where the changes are cached by the data provider application until the user synchronizes the data in the spreadsheet with the data in the data source. When the data is synchronized, the changes are published to the data source as described above to change the corresponding data in the data source. Similarly, the user can at anytime refresh the data which causes changes made by the user in the spreadsheet to be published to the data source and causes changes made to the data in the data source to be brought into the spreadsheet.

When the data provider application synchronizes with the data source at the server, the data provider application builds a batch of update commands based on the rows in the data source list that have been modified. Each row has an indicator as to whether the row has been modified and which columns have been affected. Based on this information an update command is created and inserted into an update batch that is sent to the server using the UpdateListItems web service call. Based on the response from the web service the conflicts and errors are generated as described below with respect to FIGS. 5 and 6. The following example shows updates to three rows in the data source:

```
<xmldata>
  <Batch OnError="Continue" ListVersion="1"
    ViewName="
{270C0508-A54F-4387-8AD0-49686D685EB2}">
    <Method ID="1" Cmd="Update">
      <Field Name="ID">4<Field>
      <Field Name="Name">Jones</Field>
    </Method>
    <Method ID="2" Cmd="Update">
      <Field Name="ID">6</Field>
      <Field Name=Name>Brown</Field>
    </Method>
    <Method ID="3" Cmd="Update">
      <Field Name="ID">8</Field>
      <Field Name=Name>green</Field>
    </Method>
  </Batch>
</xmldata>
```

In order to allow for proper synchronization of data between the spreadsheet and the data source, tracking of data in the spreadsheet is required. When working with this externally linked data in the spreadsheet, it is necessary to be able to sort, filter and work with the data in ways that making row tracking essential. To accomplish this, a relationship is established between the data provider application and the data in the spreadsheet that is key based instead of location based. This enables sorting, filtering and deleting that may not have been enabled otherwise. To accomplish this joining between the spreadsheet and the data provider application, an ID field is written into the spreadsheet. This ID field is tied to a particular record in the OLE-DB data provider application and allows a user to make changes in ordering, editing key identity fields in the record and delete rows. According to one embodiment, the spreadsheet application creates a read-only column that contains the key for creating the connection between the spreadsheet and the data provider application. This key then sorts with the row. As should be understood use of the ID field is one implementation, and other methods of establishing a keyed relationship between rows in the spreadsheet and rows in the data provider application may be utilized.

According to an embodiment, the spreadsheet application 220 allows users to modify the order that the columns appear in spreadsheet without changing the order that they appear in the view or the data source. Additionally, the spreadsheet allows users to format the data (with the exception of Formatted Text Fields) without changing the data source. When a data source list is first brought into a spreadsheet according to the present invention, regardless of the method, the field order on the worksheet is set based on the order of the visible fields. This view information is obtained through a call to the data provider application. The spreadsheet application may make changes to the ordering. First, the spreadsheet application always put an OLE-DB bookmark column as the first field. Second, the spreadsheet application handles any calculated fields that are in the visible fields list. For the spreadsheet application to properly handle a calculated field, the spreadsheet application needs to have all the other fields it depends on to be visible.

Once the data source list is in the spreadsheet, the ordering of the fields in the spreadsheet is under user control. The user can make use of the spreadsheet's existing functionality (such as Edit-Cut Edit-Paste or using the mouse to drag cells around) to move/re-order the fields within the data source list. While there is no requirement that the fields be in a particular order, a couple of restrictions do apply. For example, all the fields must stay within the data source list range, and the header cell for all the fields must all be in the same spreadsheet worksheet row. According to an embodiment, pre-existing query table code is used to remember where the user put each field. Changes made to the field ordering in the spreadsheet do not affect the ordering of the fields the user sees in the data source.

When the user synchronizes or refreshes data to a data source list, the order of the fields on the worksheet will not change. However if new fields come in during synchronize/refresh they will be appended to the existing fields on the worksheet. If fields disappear during synchronization or refresh operations, then the fields will be deleted from the worksheet without causing a re-ordering of the rest of the fields. This also is pre-existing query table behavior.

When the user publishes an existing data source list, the spreadsheet application uses the order of the fields as they currently appear on the worksheet. The exception is if the data source list does not have an OLE-DB bookmark column then we will add one and position it before the existing fields. After this point the field ordering is once again all under user control as described above.

According to embodiments, new rows may be added to the data source, existing rows may be edited and existing rows may be deleted by changes made by the user to the spreadsheet worksheet. In each case the data provider application is utilized for tracking changes made and for persisting those changes to the data source.

When a data source list is first brought into a spreadsheet worksheet the cells that the list data are to be put into are cleared of any existing user formatting. Then formatting is applied based on the type of each column. Once the data source list is in the spreadsheet, the user is allowed flexibility in formatting the cells in the data source list. The user applies formatting to the cells through the normal spreadsheet user interface methods such as Format-Cells. This formatting is retained when the data source list is synchronized or refreshed. If new rows come into the data source list during synchronize/refresh operations then formatting will be applied to those cells based on existing formatting in the data source list. Each field in the data source list is evaluated individually, and pre-existing code is run to determine if the rows in a field in question have consistent formatting, and if not, then that formatting is applied to the new cells in that field. According to one embodiment, the user may change the data type of a field in the data source. The spreadsheet application can detect this change and thus apply the appropriate data source list specific formatting. The formatting properties that are set are based on the new data type of the field.

Persistence of the Data Source

According to one embodiment, the spreadsheet has two streams of data to persist when working with editable data including the record source, represented by the data provider application, and the cell table (i.e., the normal spreadsheet data). These streams represent the data in two states, including the information that has been pulled from the data source and marked for changes, and the record of display as represented in the cells of the spreadsheet.

In general, the spreadsheet application writes out the cell data for the data source list, and the data provider application writes out the recordset and connection information. The data provider application writes out the entire cached data and schema (data mapping and data type rules) to file in order to support taking an SharePoint List Offline in the spreadsheet application. The data stream is written out as an Extensible Markup Language (XML) file and is compressed to save space. According to one embodiment, the XML format is identical to the SharePoint web services wire format that the data provider application is familiar with. The data provider application exports the list schema, data and pending updates as sections of XML.

A data source list schema section is exactly how it is returned by a SOAP method GetList (see sample XML set out below). A data section is exactly what is returned for a GetListItems (see sample XML set out below) SOAP method. An Updates section contains updates in the same format as the data section with only the changed columns being persisted. For deleted rows only the row ID and version are exported in the XML. For new rows only the changes are written out. Writing out the hidden version is necessary for recognizing conflicts. When a row is updated on data source, its version is incremented. When updates are posted by the data provider application to the data source, the version of the row that the data provider application has is also sent to the data source as part of the update. If there is a mismatch between this version and the current row version on the data source, a conflict is reported and the update for that row is aborted. An STSList element is used as a container to hold the three different sets of data. If the data or update sections are empty or missing, the data provider application will continue to load the list. If the data source list element is missing or empty the data provider application will return an error and abort the data import. The data is exported in the following format:

```
<STSList>
    <List DocTemplateUrl="" DefaultViewUrl="/Lists/testlist/AllItems.aspx"
        ID="{B474B0C0-8B32-4065-83AB-312403198256}"          Title="smith"
        Description="testing    list"      ImageUrl="_layouts/images/itgen.gif"
        Name="{B474B0C0-8B32-4065-83AB-312403198256}"          BaseType="0"
        ServerTemplate="100" Created="20011129 18:56:28"
        Modified="20011130 02:06:51" Version="3" Direction="0" ThumbnailSize="0"
        WebImageWidth="0" WebImageHeight="0" Flags="0" ItemCount="3">
        <Fields>
            <Field   ColName="tp_ID"   ReadOnly="TRUE"   Type="Counter"
            Name="ID"
                PrimaryKey="TRUE"                       DisplayName="ID"
            FromBaseType="TRUE" />
            <Field   Type="Text"   Name="Title"   DisplayName="Title"
            Required="TRUE"
                FromBaseType="TRUE" ColName="nvarchar1" />
            . . .
        </Fields>
    </List>
    <View            Name="{A2E29DD9-7FC5-427F-AB41-81713F71F708}"
    DefaultView="TRUE"
        Type="HTML"   DisplayName="All Items"  Url="Lists/testlist/AllItems.aspx"
        BaseViewID="1">
        <ViewFields>
            <FieldRef Name="Attachments" />
            <FieldRef Name="LinkTitle" />
            <FieldRef Name="currency" />
            <FieldRef Name="smithcalc" />
        </ViewFields>
        <RowLimit Paged="TRUE">100</RowLimit>
        <Query>
            <OrderBy>
                <FieldRef Name="ID" />
            </OrderBy>
        </Query>
        <Formats>
        </Formats>
    </View>
    <Data>
        <xml xmlns:s="uuid:BDC6E3F0-6DA3-11d1-A2A3-00AA00C14882"
            xmlns:dt="uuid:C2F41010-65B3-11d1-A29F-00AA00C14882"
            xmlns:rs="urn:schemas-microsoft-com:rowset"
            xmlns:z="#RowsetSchema">
            <rs:data>
                <z:row ows_ID="3" ows_Title="my funky row b"
                    ows_Modified="2001-11-29 17:47:54"
                    ows_Created="2001-11-29               17:47:54"
                ows_Author="Smith"
                    ows_Editor="Smith" ows_owshiddenversion="0"
                    ows_Attachments="0" ows_EditMenu="3"
                    ows_LinkTitle="my funky row b" />
                <z:row ows_ID="4" ows_Title="my funky row c"
                    ows_Modified="2001-11-29 17:48:00"
                    ows_Created="2001-11-29               17:48:00"
                    ows_Author="Smith"
                    ows_Editor="Smith" ows_owshiddenversion="0"
                    ows_Attachments="0" ows_EditMenu="4"
                    ows_LinkTitle="my funky row c" />
                <z:row ows_ID="5" ows_Title="my funky row d"
                    ows_Modified="2001-11-29 17:48:06"
                    ows_Created="2001-11-29               17:48:06"
                ows_Author="Smith"
                    ows_Editor="Smith" ows_owshiddenversion="0"
                    ows_Attachments="0" ows_EditMenu="5"
                    ows_LinkTitle="my funky row d" />
                . . .
            </rs:data>
    </Data>
    <Update>
        <Inserts>
            <xml xmlns:s="uuid:BDC6E3F0-6DA3-11d1-A2A3-00AA00C14882"
                xmlns:dt="uuid:C2F41010-65B3-11d1-A29F-00AA00C14882"
                xmlns:rs="urn:schemas-microsoft-com:rowset"
                xmlns:z="#RowsetSchema">
            <rs:data>
            <z:row ows_Title="my funky row z" />
            </rs:data>
        </Inserts>
        <Updates>
```

-continued

```
<xml xmlns:s="uuid:BDC6E3F0-6DA3-11d1-A2A3-00AA00C14882"
    xmlns:dt="uuid:C2F41010-65B3-11d1-A29F-00AA00C14882"
    xmlns:rs="urn:schemas-microsoft-com:rowset"
    xmlns:z="#RowsetSchema">
  <rs:data>
    <z:row ows_ID="3" ows_Title="my funky row updated"
        ows_owshiddenversion="2" />
  </rs:data>
/<Updates>
<Deletes>
  <xml xmlns:s="uuid:BDC6E3F0-6DA3-11d1-A2A3-00AA00C14882"
      xmlns:dt="uuid:C2F41010-65B3-11d1-A29F-00AA00C14882"
      xmlns:rs="urn:schemas-microsoft-com:rowset"
      xmlns:z="#RowsetSchema">
    <rs:data>
      <z:row ows_ID="4" ows_owshiddenversion="0" />
    </rs:data>
  </Deletes>
</Update>
</STSList>
```

For all data source lists, additional information is saved in a spreadsheet XLS regarding data source list properties and data source list field properties. Some of the data source list properties include position on the spreadsheet worksheet, data source list name, whether the data source list is showing its total row, and the like. Some of the data source list field properties include list field caption, data type, type of subtotal aggregate to use when the list's total row is showing, filter settings, formatting settings, etc. For data source data lists, additional list and list field properties are saved. For data source lists, there is additional information stored about the data in the list and changes the user has made to the data. The spreadsheet application is not responsible for this data stream though it is saved in the XLS file. On save, the spreadsheet application asks the data provider application to write this data stream, and on load, the spreadsheet application asks the data provider application to read it.

One concern associated with data communication between the spreadsheet and the data source is the integrity of the row data in a spreadsheet data list linked to a data source list since data changes may be held offline and then may be submitted/committed to the data source later even after the file may have been modified and saved in a different version of the spreadsheet application. Without preservation of the data integrity or if the spreadsheet cannot detect a data integrity violation, then a user could unknowingly submit/commit changes to the data source list that the user did not make or the user may not realize changes that the user made will not actually be submitted/committed. To address this concern a hash value is calculated for each data source list. The hash value is used as a checksum on the data in the data source list. According to one embodiment, a data source list hash value is calculated for a data source at save time using the Microsoft Cryptographic Service Provider.

A hash value is calculated for each row of the data source list based on the data in that row. The hash values for all the rows are combined and furthermore the hash calculated for the data provider application cache stream for this data source list is combined in as well to produce the final "check sum" that is saved with the file. The hash value is calculated for every row whether the user has changed data in that row or not. Furthermore the hash value is calculated on cell data whether that cell has been changed or not.

When a data source list is re-loaded, the hash check sum is recalculated no matter what version of the spreadsheet application saved the file last. The hash is recalculated in the exact same manner as at save time so if the two hash check sum values do not match then it is determined that a data integrity problem exists. When a data integrity problem is detected, the user is prevented from making any further changes to the data source list until the user discards changes and refreshes the data. According to an embodiment of the invention, the hash check sum may be used to detect the following types of data integrity problems: data changes to the data source list in previous versions of the spreadsheet application; a hacked spreadsheet XLS file that changed data in the data source list data range; a hacked data provider application cache stream that changed cached values; a hacked spreadsheet application XLS file or data provider application cache stream that change the hash check sum value; and some structural integrity problems such as removal of one or more columns from the data source list range.

When loading the persisted XML from cache, the data provider application makes some security checks in order to ensure the data has not been tampered with. When writing out the data and updates as part of the XML, the hash for the data and updates is written out in the persisted stream as well. When reloading the data back, the hash is recalculated and if there is a mismatch, the data list will fail to open. This is done to prevent a user from posting data on behalf of another user. The hash is computed using cryptographic API's mentioned above. When the cache is loaded from the data provider application, the updates are not sent to the server right away. The updates are applied to the cache in-memory locally, and once the user decides to post the updates, they are sent to the data source at the server.

Error Detection and Conflict Resolution

If the data provider application 225 determines that an error condition will arise if the cached data is published or attempted to be published to the specified data source in the database 235, the data provider application 225 will receive from the database 235 error codes associated with any error condition resulting from the attempted publication of data to the database 235. Based on the error codes received by the data provider application 225, one or more data publication errors will be presented to the user via the spreadsheet application 220 to alert the user of the failure to publish the desired data to the database 235.

Referring to FIG. 5, a plurality of potential error conditions is illustrated in the error table 500. For example, the "server not found" error 510 may be presented to the user if the data source specified by the user is no longer available to receive data. The "list not found" error 515 may be presented to the user where for some reason the named data list is not found at the specified data source location. The "permissions" error 520 may be presented to the user if the user's permissions for exporting data to the specified data source have been revoked or otherwise modified such that the user is no longer allowed to publish data to the specified data source. The "additional errors" error 525 may include any of a number of potential errors that may be presented upon an attempted publication of data from a spreadsheet application to a specified data source. For example, a separate user of the specified data source may have altered the data source schema such that specified data source locations and fields no longer exist, or where data types published by the user are no longer acceptable.

As should be understood by those skilled in the art, the error conditions listed in the table 500 and the additional errors described herein are by way of illustration only and are not restrictive of the many types of error conditions that may be reported to a user via the data provider application 225. According to embodiments of the invention many of the error messages illustrated in FIG. 5 may have different wordings, including one wording for the publish case which creates a new database/table and a different wording for the case where changes are being published to an existing database/table. For example the following are errors and wordings associated with the publishing changes case:

Server Not Found: Cannot connect to the server at this time. Changes to your data cannot be saved;

Timeout: Cannot connect to the server at this time. Changes to your data cannot be saved;

Server Busy: The server is busy at this time. Changes to your data cannot be saved;

List not Found: The list does not exist. It may have been deleted by another user;

Unanticipated Error: An unexpected error has occurred. Changes to your data cannot be saved;

Permissions: You do not have adequate permissions to modify this list. Changes to your data cannot be saved; and Quota: Your quota for this site has been exceeded. Changes to your data cannot be saved.

Any condition that may prevent the successful publication of data from the spreadsheet application 220 to a specified data source location at the database 235 may result in an error condition being reported to the user, as described above.

In addition to resolution of error conditions, embodiments of the present invention provide for resolution of conflicts created between data being published by the user to the database 235 as compared to data that has previously been published to the same data source location. For example, if the user is publishing data to a data source containing trip report information covering business trips performed by employees of an organization, the user may attempt to publish modified data to a data source location that is in conflict with modifications made to the same data by a different employee of the organization. The other employee of the organization may have modified the trip location data immediately before the attempted publication of modified data by the user, or the user may have performed modifications to the data via the user's spreadsheet application 220 in an offline session followed by an attempt to publish the data to the trip report data source in a subsequent on-line communication. Rather than having the subsequent users data automatically write over the previous user's data, embodiments of the present invention advantageously present the subsequent user with a conflicts resolution dialog such as the dialog box illustrated in FIG. 6 to allow the user to compare the user's data input with the conflicting data input from the previous user.

Referring to FIG. 6, the dialog box 600 includes a field for showing the present user's data changes as compared to the other user's data changes. By way of example, as illustrated in FIG. 6, a city destination 610 shows a data input of "Boston" for the city destination input by the other user's data changes. The present user's data changes include a city destination 615 of "Dallas" which is in conflict with the data input by the other user. Rather than have the second user's data write over the first user's data, the dialog box 600 allows the second user an opportunity to resolve a conflict in the data. If the second user realizes that his changes are erroneous, the user may select the "Discard My Changes" button 620, and the first user's changes will be persisted in the data source of the database 235. On the other hand, if the second user determines that his data changes are correct, the second user may select the "Retry My Changes" button 625 to cause a second user's data changes to write over the first user's data changes.

According to embodiments of the present invention, the second user may be permitted to retry all the second user's changes causing all the second user's changes to write over the previous user's changes. Alternatively, the second user may select to discard all his changes thus leaving all the previous user's changes persisted in the database 235. If the second user desires to discard his changes, but keep his changes persisted in the spreadsheet application worksheet 220, the user may select the "Unlink My List" button 630 which will disconnect the communication link between the spreadsheet application 220 and the database 235 while leaving the second user's data persisted in his spreadsheet application worksheet. According to an alternative embodiment, the data changes of the subsequent user may be merged with the data changes of the previous user where any conflicting data is resolved by accepting the most recent data change in time.

Figure 7:
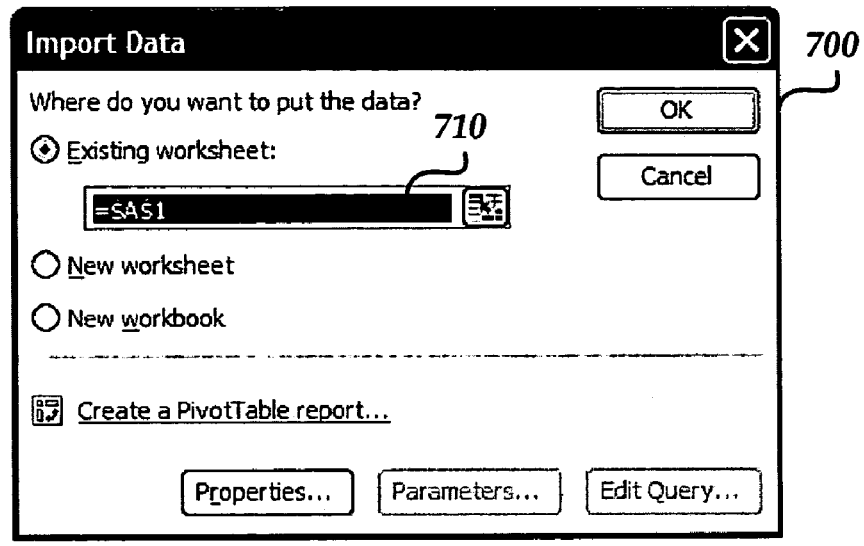
FIG. 7 illustrates a computer screen display showing an illustrative dialog box for importing data from a data source to a spreadsheet application worksheet according to embodiments of the present invention.

As briefly described above, in addition to exporting data from a spreadsheet application worksheet to a data source of the database 235 via the data provider application 225, data may also be imported from a data source to a spreadsheet application worksheet. FIG. 7 illustrates a computer screen display showing an illustrative dialog box for importing data from a data source to a spreadsheet application worksheet according to embodiments of the present invention. Referring to FIG. 7, if the user selects a particular user file from a data source in the database 235 for downloading to the user's spreadsheet application worksheet, the file is downloaded from the data source to the user's local computer 2 and either a presently opened version of the spreadsheet application is utilized or the spreadsheet application is launched automatically.

The downloaded file is opened after preferable security checks and the information is passed through to the spreadsheet application for processing via the data provider application 225. Once the connection data has been passed to the spreadsheet application, the spreadsheet application creates a user interface dialog, such as is illustrated in FIG. 7, for allowing the user to select a location in the spreadsheet application worksheet for importing the downloaded data. As shown in FIG. 7, the dialog box 700 includes a data field for allowing the user to select a location in a given spreadsheet application worksheet for importing the downloaded data. The user may select an existing worksheet, a new worksheet, or a new spreadsheet work book. Additionally, an option is illustrated in the dialog box in FIG. 7 for allowing the user to create a PivotTable Report instead of a list table. Once the user has selected a location in the spreadsheet application worksheet for importing the data, the spreadsheet application creates an instance of the data provider application and passes the connection information. A "refresh" command to the data provider application 225 may then be used for causing the data to be passed from the data provider application memory cache 245 to the spreadsheet application worksheet as specified by the user.

Figure 8:
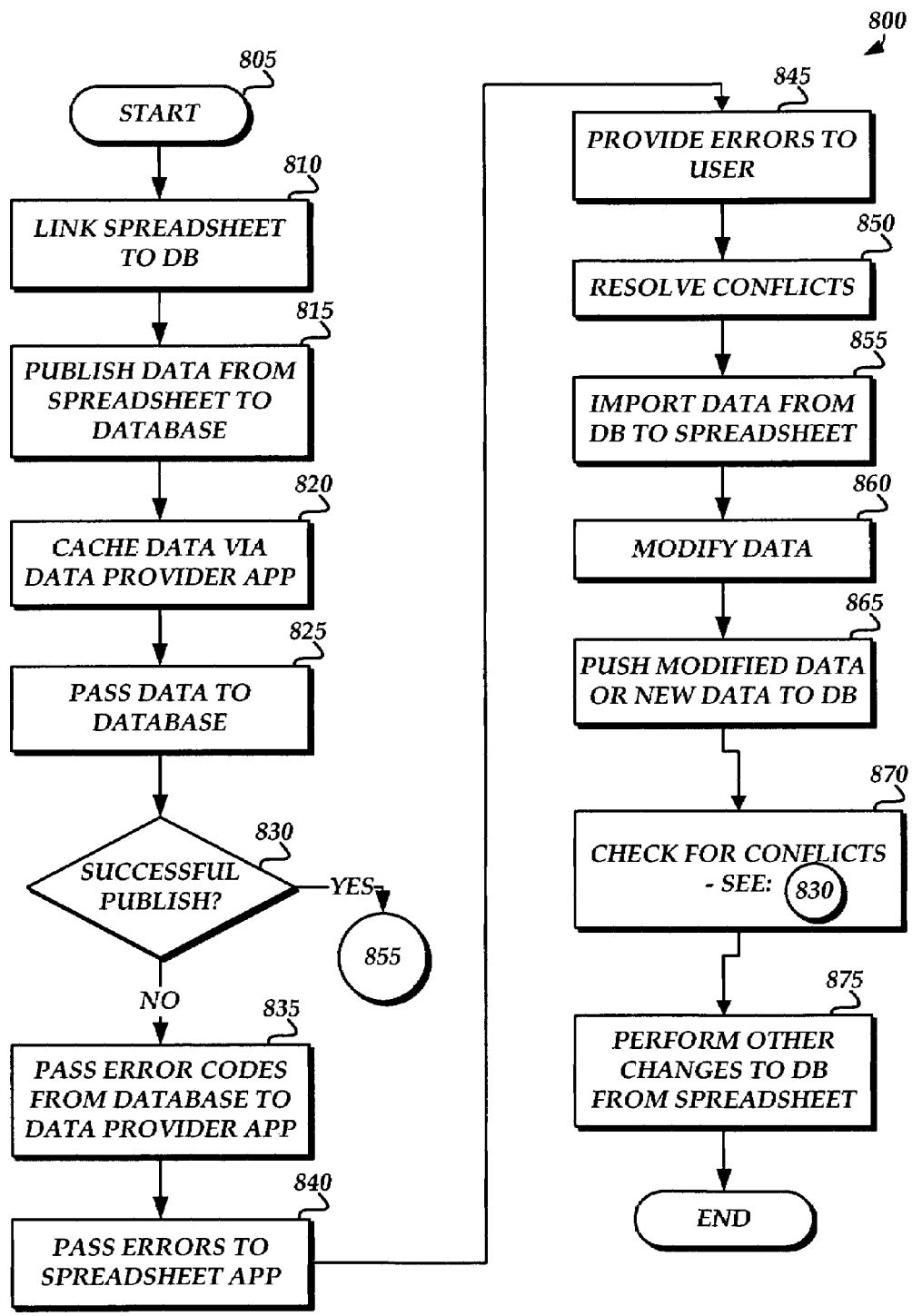
FIG. 8 is a flow diagram showing an illustrative routine for bi-directional communication between a spreadsheet application worksheet and a remote data source.

Having described the functionality and advantages associated with components and embodiments of the present invention above, it is advantageous to describe embodiments of the present invention in terms of an exemplary operation of embodiments of the present invention. FIG. 8 is a flow diagram showing an illustrative routine for bi-directional communication between a spreadsheet application worksheet and a remote data source. The routine 800 begins at start block 805 and proceeds to block 810 where a user prepares to establish a communication link between a spreadsheet application worksheet and a specified data source at a database 235 as described above with reference to FIG. 3. At block 815, the user attempts to establish the data connection by confirming and publishing specified data or data modifications to a specified data source location as described above with reference to FIG. 4. At block 820, data published by the user is cached by the data provider application 225 at the memory cache 245. At block 825, the data provider application 225 attempts to pass the cached data to the data source at the database 235.

At block 825, the data provider application performs a comparison between the data being published by the user with data maintained at the target data source to determine whether any data conflicts will arise. The data provider application 225 also reviews any properties associated with the target data source, such as permission properties that may create an error condition if the user's data is allowed to publish to the target data source. As mentioned above, data publication errors may occur anytime during the publication operation as opposed to only at the beginning of data publication. Most data publication errors, other than data conflicts, prevent the publication operation from continuing to completion. At block 830, a determination is made by the data provider application as to whether the user's data may successfully publish to the target data source. If so, the routine moves to block 855, as described below.

If the user's data may not successfully publish to the target data source, the routine moves to block 835 and error codes are passed from the database 235 to the data provider application associated with any error conditions that arise as a result of the attempted publication of data from the spreadsheet application worksheet to the target data source. At block 840, the data provider application 225 passes errors to the spreadsheet application. At block 845, the spreadsheet application provides the error conditions to the user as described above with reference to FIG. 5. At block 850, the user may resolve any error conditions and retry the publication of data to the target data source. For example, if a "permissions" error is presented to the user, the user may contact her network administrator to have appropriate permissions granted to the user to allow the user to export the desired data from the user's spreadsheet application worksheet to the target data source in the database 235. If the user is presented with data conflicts, such as described above with reference to FIG. 6, the user may resolve those data conflicts by retrying the user's data changes, discarding the user's data changes, or by unlinking the user's spreadsheet application worksheet from the target data source.

If the user successfully connects to the target data source, the routine moves to block 855, and the user may now communicate with the target data source, as described herein. For example, at block 855, the user may import data from a target data source in the database 235 to the user's spreadsheet application worksheet. At block 860, the user may modify the imported data, and at block 865 the user may push the modified data or new data back to the target data source in the database 235. At block 870, the data provider application 225 may once again check for error conditions or data conflicts resulting from the exporting of the modified data back to the target data source at block 865.

At block 875, the user may perform other changes to the target data source in the database 235. For example, as described above, the user may create, edit, and/or delete rows and columns in a given data source. The user may refresh data contained in the user's spreadsheet application worksheet whereby data contained in a linked data source is automatically refreshed to the user's spreadsheet application worksheet. This functionality is useful where a second user may have modified or otherwise updated data contained in a data source linked to the first user's spreadsheet application worksheet where the other user's changes are not presently reflected in the data contained in the first user's spreadsheet application worksheet. The first user may work in an offline environment where her data changes are cached by the data provider application during the offline session. Subsequently, the user may synchronize her spreadsheet application with the data source to export changes made during the user's offline session to a target data source or to import any data changes made to the target data source by other users while the first user was working in an offline session. The user may also unlink her spreadsheet application from a given data source and subsequently publish changes made to data with her local spreadsheet application to the data source after re-establishing a link with the data source.

As described herein, embodiments of the present invention provide for bi-directional communication between a spreadsheet application worksheet and a database data source whereby data may be imported from a target data source to a spreadsheet application worksheet, and whereby modified data from the spreadsheet application worksheet may be written back to the target data source for modifying the data contained in the target data source. Advantageously, error conditions and data conflicts caused by the attempted publication of data from a spreadsheet application worksheet to a target data source may be highlighted to the user of the spreadsheet application worksheet to allow the user to resolve the error conditions and data conflicts. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of bi-directional communication between a spreadsheet application and a database, comprising:
   connecting a spreadsheet to a data source;
   importing via the spreadsheet application data to the spreadsheet from the data source:
   modifying the imported data in the spreadsheet
   publishing data from the spreadsheet to the data source via the spreadsheet application;
   determining whether publishing the data to the data source creates a conflict with data previously published to the data source via the spreadsheet application; and
   storing the data at the data source including writing via the spreadsheet application any changes made to the data in the spreadsheet over corresponding data previously stored at the data source;
   whereby publishing the data to the data source includes publishing imported data back to the data source and writing the modified imported data over the data in the data source from which the data was imported to the spreadsheet.

2. The method of claim 1, whereby the data source is a database data source.

3. The method of claim 1, whereby connecting a spreadsheet to a data source includes connecting the spreadsheet to the data source via a bi-directional communication protocol.

4. The method of claim 3, whereby the bi-directional communication protocol includes an OLE-DB communication protocol.

5. The method of claim 3, whereby connecting the spreadsheet to the data source via a bi-directional communication protocol includes connecting the spreadsheet to the data source via a data provider application.

6. The method of claim 5, prior to publishing the data from the spreadsheet to the data source, passing the data to the data provider application.

7. The method of claim 6, prior to publishing the data from the spreadsheet to the data source, storing the data in a memory cache via the data provider application.

8. The method of claim 1, prior to storing the data at the data source, determining whether publishing the data to the data source creates an error condition.

9. The method of claim 8, whereby determining whether publishing the data to the data source creates an error condition includes querying the data source by a data provider application for determining whether publishing the data to the data source creates an error condition.

10. The method of claim 8, whereby if publishing the data to the data source creates an error condition, returning an error message to the spreadsheet.

11. The method of claim 10, whereby returning an error message to the spreadsheet includes identifying a data publication error associated with the error condition.

12. The method of claim 11, whereby the data publication error is a user permission error.

13. The method of claim 11, whereby the data publication error is a data source not available error.

14. The method of claim 11, whereby the data publication error identifies that a data source schema does not support publication of the data.

15. The method of claim 11, whereby the data publication error identifies that the data source does not support one or more data types associated with the published data.

16. The method of claim 1, whereby determining whether publishing the data to the data source creates a conflict with data previously published to the data source includes comparing the data with data previously published to the data source.

17. The method of claim 16, whereby comparing the data with data previously published to the data source includes comparing the data by a data provider application.

18. The method of claim 1, whereby if publishing the data to the data source creates a conflict with data previously published to the data source, passing an identification of any of the data that creates a conflict with data previously published to the data source to the spreadsheet for alerting a user of the spreadsheet as to the data conflict.

19. The method of claim 1, whereby if publishing the data to the data source creates a conflict with data previously published to the data source, resolving the conflict by accepting a latest data published to the data source.

20. The method of claim 1, whereby if publishing the data to the data source creates a conflict with data previously published to the data source, resolving the conflict by discarding any of the data that conflicts with corresponding data of the data previously published to the data source.

21. The method of claim 1, whereby if publishing the data to the data source creates a conflict with data previously published to the data source, resolving the conflict by merging the data with the data previously published to the data source such that for any portion of the data that conflicts with a corresponding portion of the data previously published to the data source, writing over the corresponding portion of the data previously published to the data source with any portion of the data that conflicts with the corresponding portion of the data.

22. The method of claim 1, further comprising breaking a communication link between the spreadsheet and the data source; and
    persisting any data modified in the spreadsheet after breaking the communication link;
    establishing a second communication link between the spreadsheet and the data source;
    publishing to the data source the data modified in the spreadsheet after breaking the communication link to the data source; and
    modifying data previously published to the data source with the data modified in the spreadsheet after breaking the communication link to the data source.

23. The method of claim 1, whereby publishing the data to the data source includes creating a new data row in the data source.

24. The method of claim 1, whereby publishing the data to the data source includes deleting a data row from the data source.

25. The method of claim 1, whereby publishing the data to the data source includes creating a new data column in the data source.

26. The method of claim 1, whereby publishing the data to the data source includes deleting a data column from the data source.

27. A computer storage medium readable by a computing system and encoding a computer program of instructions for executing a computer process for bi-directional communication between a spreadsheet application and a database, said computer process comprising:
    connecting a spreadsheet to a data source;
    importing data to the spreadsheet from the data source via the spreadsheet application;
    modifying the imported data in the spreadsheet via the spreadsheet application;

publishing the modified imported data back to the data source and writing the modified imported data over the data in the data source from which the data was imported to the spreadsheet;

determining whether publishing the data to the data source creates a conflict with data previously published to the data source via the spreadsheet application; and storing the data at the data source including writing via the spreadsheet application any changes made to the data in the spreadsheet over corresponding data previously stored at the data source.

28. The computer storage medium of claim 27, whereby connecting a spreadsheet to a data source includes connecting the ssheet to the data source via a bi-directional communication protocol through a data provider application integrated with the spreadsheet application.

29. The computer storage medium of claim 28, prior to publishing the modified imported data back to the data source, querying the data source by the data provider application for determining whether publishing the data to the data source creates an error condition; and if publishing the data to the data source creates an error condition, returning an error message to the spreadsheet.

30. A method of bi-directional communication between a spreadsheet application and a database, comprising:

connecting a spreadsheet to a data source via a bi-directional communication protocol allowing data to flow between the spreadsheet and the data source;

importing via the spreadsheet application, data to the spreadsheet from the data source;

modifying the imported data in the spreadsheet via the spreadsheet application;

exporting via the spreadsheet application the modified imported data back to the data source and writing the modified imported data over the data in the data source from which the data was imported to the spreadsheet;

determining whether writing the modified imported data to the data source creates a conflict with data previously written to the data source by comparing the modified imported data with data previously written to the data source; and storing the data at the data source including writing via the spreadsheet application any changes made to the data in the spreadsheet over corresponding data previously stored at the data source.

31. The method of claim 30, further comprising:

notifying a user of the spreadsheet of a conflict via a data conflict message passed to the spreadsheet via the bi-directional communication protocol; and resolving the conflict by writing the modified imported data to the data source or by discarding the modified imported data so as to persist the data previously written to the data source.

* * * * *